Patented Mar. 14, 1933

1,901,536

UNITED STATES PATENT OFFICE

JOSEF SCHÄFER, OF BASEL, SWITZERLAND, ASSIGNOR TO THE FIRM OF J. R. GEIGY S. A., OF BASEL, SWITZERLAND

MANUFACTURE OF TANNING SUBSTANCES

No Drawing. Application filed October 9, 1931, Serial No. 567,925, and in Germany November 10, 1930.

According to this invention substances having good tanning properties are produced by heating an aromatic sulphonic acid together with formaldehyde and a dihydroxydiarylsulphone in acid solution. Instead of aromatic sulphonic acid there may be used the condensation product thereof with formaldehyde or sulphur chloride. The sparingly soluble sulphone passes into solution in the course of the condensation and the product dissolves in all proportions in water, and in feebly acid solution has good tanning properties. The products of the invention yield precipitates with ferric chloride and can be precipitated from their solutions by means of common salt.

The proportions of the components and the duration of the heating may be varied within wide limits.

The following examples illustrate the invention, the parts being by weight:—

Example 1

100 parts of the sulphonation mixture obtained by heating for several hours 520 parts of naphthalene with 560 parts of concentrated sulphuric acid at 140–160° C. until the mass is soluble in water, are heated together with 100 parts of a dihydroxydiarylsulphone (for instance one obtained by heating for 3 hours 540 parts of phenol with 180 parts of fuming sulphuric acid of 60 per cent strength at 170–180° C. and then distilling off the excess of phenol), 50 parts of water and 45 parts of formaldehyde of 30 per cent strength, for about 1 hour at 105–110° C. The product is soluble to a clear solution in water; for tanning, the product is made feebly acid by addition of alkali lye and is made up with water to a solution of specific gravity 25° Bé. The solution has a strong capacity for precipitating gelatine, analogously to the vegetable tanning agents; it yields a strong precipitate with ferric chloride and the dissolved product can be salted out by means of common salt.

Example 2

100 parts of naphthalene-sulphonic acid, made as described in Example 1, 10 parts of water and 30 parts of formaldehyde of 30 per cent strength are heated together for 1 hour at 110–120° C. After adding further 10 parts of formaldehyde, of the same strength 20 parts of water and 50 parts of the sulphone made as described in Example 1, the whole is heated for 1 hour at 105–110° C. The product may be further treated as described in Example 1, and has properties analogous to those of the product of that example.

Example 3

100 parts of naphthalene-sulphonic acid, made as described in Example 1, are melted and mixed with 40 parts of sulphur chloride. There are then added 40 parts of water, 30 parts of formaldehyde of 30 per cent strength and 50 parts of the sulphone made as described in Example 1, and the whole is heated for 1 hour to 105–110° C. The further treatment and the properties of the product are similar to those described in Example 1.

Example 4

100 parts of a sulphonation mixture, obtained by heating 100 parts of tetrahydronaphthalene with 100 parts of concentrated sulphuric acid at 120° C. until the mass is soluble in water, are mixed with 60 parts of water, 30 parts of formaldehyde of 30 per cent strength and 70 parts of the sulphone made as described in Example 1, and the mixture is heated for about 1 hour at 105–110° C.

The further treatment and the properties of the product are as described in Example 1.

Example 5

65 parts of crude cresol are heated with 65 parts of concentrated sulphuric acid for 1 hour at 110° C. After cooling and dilution with 13 parts of water, the product is condensed with 20 parts of formaldehyde of 30 per cent strength in the cold. After addition of 65 parts of caustic soda lye of 37 per cent strength, 20 parts of formaldehyde of 30 per cent strength and 40 parts of the sulphone obtained as described in Example 1, the whole is heated for 1½ hours at 105–110° C. The product is more sparingly soluble in the cold than the product of Example 1, but otherwise shows similar properties.

Example 6

Instead of the sulphone used in Example 1, a product is used which is obtained in similar manner from a crude phenol, which consists of about equal parts of phenol and ortho-cresol.

Example 7

The operation is analogous to that described in Example 1, but a sulphone is used which is made in the following manner: 216 parts of crude cresol, consisting of a mixture of ortho-, para- and meta-cresol, are mixed with 180 parts of fuming sulphuric acid of 60 per cent strength and the mixture is heated for ½ hour at 110° C. After addition of 324 parts of phenol, the whole is heated for 3 hours at 170–190° C. and the excess of phenol is distilled off in a vacuum.

Example 8

The operation is analogous to that described in Example 1, but instead of the sulphone made from phenol there is used a product to be substituted for the sulphone, which is obtained as follows: 200 parts of the sulphonation mixture of naphthalene and sulphuric acid described in Example 1 are heated together with 20 parts of fuming sulphuric acid for ½ hour at 120° C. After addition of 200 parts of phenol the whole is heated for 3 hours at 170–180° C. and the excess of phenol is then distilled off in a vacuum.

What I claim is:—

1. A process for the manufacture of tanning substances, consisting in heating in acid solution a dihydroxydiarylsulphone with formaldehyde in presence of an aromatic sulphonic acid.

2. A process for the manufacture of tanning substances, consisting in heating in acid solution a dihydroxydiarylsulphone with formaldehyde in presence of a condensation product of an aromatic sulphonic acid with formaldehyde.

3. A process for the manufacture of tanning substances, consisting in heating in acid solution a dihydroxydiarylsulphone with formaldehyde in presence of a condensation product of an aromatic sulphonic acid with sulphur chloride.

4. A process for the manufacture of tanning substances, consisting in heating in acid solution a naphthalene sulphonic acid with a dihydroxydiarylsulphone obtained from a phenol by its heating with fuming sulphuric acid, and with water and formaldehyde.

5. As new articles of manufacture, tanning substances consisting of the condensation product from a dihydroxydiarylsulphone, formaldehyde and an aromatic sulphonic acid, said tanning substances showing in solution the usual characteristics of precipitation with ferric chloride and of precipitating gelatine.

In witness whereof I have hereunto signed my name this 26th day of September, 1931.

JOSEF SCHÄFER.